(12) United States Patent
Suto et al.

(10) Patent No.: US 11,790,568 B2
(45) Date of Patent: Oct. 17, 2023

(54) IMAGE ENTITY EXTRACTION AND GRANULAR INTERACTIVITY ARTICULATION

(71) Applicant: KYNDRYL, INC., New York, NY (US)

(72) Inventors: Tiberiu Suto, Franklin, NY (US); Shikhar Kwatra, San Jose, CA (US); Vijay Ekambaram, Chennai (IN); Hemant Kumar Sivaswamy, Pune (IN)

(73) Assignee: KYNDRYL, INC, New York, NY (US)

( * ) Notice: Subject to any disclaimer, the term of this patent is extended or adjusted under 35 U.S.C. 154(b) by 0 days.

(21) Appl. No.: 17/215,432

(22) Filed: Mar. 29, 2021

(65) Prior Publication Data

US 2022/0309715 A1 Sep. 29, 2022

(51) Int. Cl.
| | | |
|---|---|---|
| *G06T 11/00* | (2006.01) | |
| *G06F 3/048* | (2013.01) | |
| *G06F 16/51* | (2019.01) | |
| *G06F 40/295* | (2020.01) | |
| *G06V 10/22* | (2022.01) | |
| *G06V 20/20* | (2022.01) | |

(52) U.S. Cl.
CPC .............. *G06T 11/00* (2013.01); *G06F 16/51* (2019.01); *G06F 40/295* (2020.01); *G06V 10/22* (2022.01); *G06V 20/20* (2022.01)

(58) Field of Classification Search
CPC ................................ G06T 11/00; G06F 3/048
See application file for complete search history.

(56) References Cited

U.S. PATENT DOCUMENTS

| | | |
|---|---|---|
| 8,588,527 B2 | 11/2013 | Boncyk |
| 8,630,513 B2 | 1/2014 | Gokturk |
| 8,849,259 B2 | 9/2014 | Rhoads |
| 9,271,133 B2 | 2/2016 | Rodriguez |
| 10,360,946 B1 * | 7/2019 | Pasala .............. H04N 21/23418 |
| 10,621,478 B2 | 4/2020 | Albadawi |
| 2008/0005064 A1 * | 1/2008 | Sarukkai ............... G06F 16/957 |

(Continued)

FOREIGN PATENT DOCUMENTS

JP 5517952 B2 6/2014

OTHER PUBLICATIONS

"Amazon Rekognition", AWS Amazon, retrieved from the Internet on Oct. 12, 2020, 13 pages.

(Continued)

*Primary Examiner* — Yi Yang
(74) *Attorney, Agent, or Firm* — Zilka-Kotab, P.C.

(57) ABSTRACT

Methods, computer program products, and/or systems are provided that perform the following operations: identifying two or more distinct elements in an image; generating a sub-image for each of the two or more distinct elements; generating adjectives descriptive of content associated with a distinct element for each sub-image; displaying a response list including the adjectives associated with the distinct element of a selected sub-image in response to an interaction with the image; obtaining annotation data based in part on the response list displayed for the distinct element of the selected sub-image; and assigning the annotation data to the distinct element of the selected sub-image, wherein the annotation data is displayed in response to an interaction with the distinct element in the image.

19 Claims, 5 Drawing Sheets

(56) References Cited

U.S. PATENT DOCUMENTS

2019/0034963 A1* 1/2019 George .............. G06Q 30/0246
2019/0236790 A1* 8/2019 Khan ...................... G06T 7/215
2019/0278796 A1* 9/2019 Lellis .................... G06F 16/435
2021/0081613 A1* 3/2021 Begun .................. G06V 30/416

OTHER PUBLICATIONS

"The Top 8 Image Recognition Tools", Brandwatch, retrieved from the Internet on Oct. 12, 2020, 4 pages, <https://www.prandwatch.com/blog/image-recognition-tools/>.

"Vision AI | Derive Image Insights via ML | Cloud Vision API", Google Cloud, retrieved from the Internet on Oct. 12, 2020, 6 pages, <https://cloud.google.com/vision/>.

Adnan et al., "Limitations of information extraction methods and techniques for heterogeneous unstructured big data", International Journal of Engineering Business Management, vol. 11: pp. 1-23, accepted: Oct. 4, 2019, DOI: 10.1177/1847979019890771.

Authors et al.: Disclosed Anonymously, "Persona Identification Through Social Multi-Network Analysis", An IP.com Prior Art Database Technical Disclosure, IP.com No. IPCOM000262812D, IP.com Electronic Publication Date: Jul. 1, 2020, 5 pages.

Authors et al.: Disclosed Anonymously, "Stylizing Map Based on Examples of Representative Styling", An IP.com Prior Art Database Technical Disclosure, IP.com No. IPCOM000252003D, IP.com Electronic Publication Date: Dec. 13, 2017, 38 pages.

Authors et al.: Disclosed Anonymously, "Systems and Methods for Adjusting Lighting to Improve Image Quality", An IP.com Prior Art Database Technical Disclosure, IP.com No. IPCOM000255201D, IP.com Electronic Publication Date: Sep. 10, 2018, 24 pages.

Duque, Juan Carlos Niebles, "Extracting Moving People and Categorizing their Activities in Video", A Dissertation Presented to the Faculty of Princeton University in Candidacy for the Degree of Doctor of Philosophy, Jan. 2011, 151 pages.

Stergiou et al., "Analyzing Human-Human Interactions: A Survey", arXiv:1808.00022v2 [cs.CV] Aug. 17, 2019, 14 pages.

* cited by examiner

IMAGE ENTITY EXTRACTION AND GRANULAR INTERACTIVITY ARTICULATION

BACKGROUND

The present invention relates generally to the field of content management, and more particularly to providing for extracting entities/elements in image data and facilitating granular interactivity with individual elements/entities depicted in an image.

SUMMARY

According to an aspect of the present invention, there is a method, computer program product and/or system that performs the following operations (not necessarily in the following order): identifying two or more distinct elements in an image; generating a sub-image for each of the two or more distinct elements; generating adjectives descriptive of content associated with a distinct element for each sub-image; displaying a response list including the adjectives associated with the distinct element of a selected sub-image in response to an interaction with the image; obtaining annotation data based in part on the response list displayed for the distinct element of the selected sub-image; and assigning the annotation data to the distinct element of the selected sub-image, wherein the annotation data is displayed in response to an interaction with the distinct element in the image.

DETAILED DESCRIPTION

Figure 1:
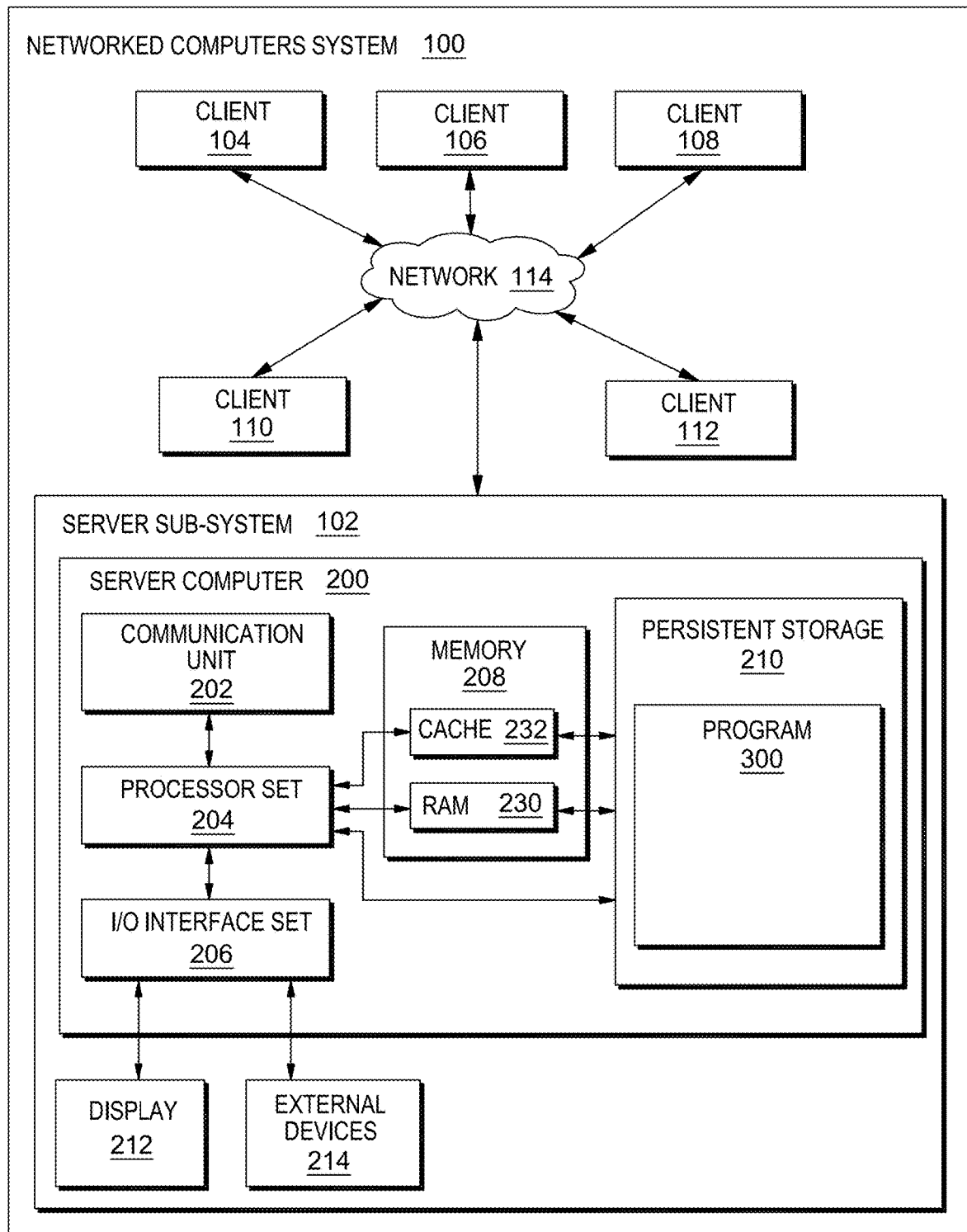
FIG. 1 depicts a block diagram view of a first embodiment of a system, according to the present invention.

According to aspects of the present disclosure, systems and methods can be provided for image entity extraction and granular interactivity articulation that allow for enhancing the interactivity with different entities identified within the images. In particular, systems and methods of the present disclosure can provide for identifying and/or extracting entities/elements included in an image and provide for generating and displaying comments and/or reactions (e.g., annotation data) specific to the entity/element over the entity/element in the image, for example, when the element is hovered over (e.g., mouse pointer, etc.), the element is clicked, and/or the like. In some embodiments, the systems and methods of the present disclosure can provide text-image correlation with spatial analysis to filter comments specific to the entity and display the comments in an overlaid format over the entity in the image. In some embodiments, the systems and methods of the present disclosure can provide for associating information extracted from comments to the respective image entity and aggregating image and/or textual comments on top of the geo-spatial location for the entity in the image. In some embodiments, the systems and methods of the present disclosure can provide for combining filtered out comments from textual content associated with the image where the specific entity/element is mentioned and the entity/element image annotation data where a comment and/or reaction was added for the element (e.g., when hovering over, clicking on, etc. an entity/element in the image, augmented reality hand gesture over entity/element, etc.). The combined comments/reactions can be displayed with the element in the image, for example, overlaying the element.

In general, when people review posts provided in a social media platform, they may be able to react to (e.g., like, etc.) and/or comment on a posted image as a single unit (e.g., on the image as a whole). However, there may be times when a user wants to provide a reaction/comment on a particular element (e.g., object, item, component, entity, etc.) included in the image. For example, a user may want to provide a more personalized reaction/comment for a particular object/item a person in the image is wearing, holding, etc.; for a specific element depicted in the image; and/or the like.

Accordingly, systems and methods of the present invention provide the ability to interact with different identified entities (e.g., elements, components, items, etc.) in an image in a seamless and implicit fashion by adding and displaying comments about specific entities overlaid in the image. In some embodiments, image elements can become hotspots within the image such that when they are hovered over, comments associated with the particular element can be viewed. In some embodiments, implicit item interaction can be provided within the image where comments regarding the identified object/entity can be directly added by clicking on an entity. An overlay can be provided where comments about a certain entity can be filtered by directly interacting/hovering over the identified element and popping notifications specific to that element in the image.

As an example, a user may be viewing a picture of a person wearing a hat and may want to provide a reaction/comment on the hat specifically. In some embodiments, the user can click or otherwise interact with the hat in the image (e.g., an identified element, etc.) and a menu could be displayed with predetermined comment choices for selection, such as "like the color of the hat," "like the style of the hat," and/or the like, that the user could select to be associated with the hat (e.g., element, etc.) in the image. In some embodiments, the menu of comment choices can include an option to allow for a user to input a customized comment for an element. In some embodiments, the comments can be displayed, for example, overlaying the respective element, when the image is interacted with, such as hovering over the element in the image, clicking on the element in the image, and/or the like.

Additionally, in some embodiments, comments associated with an image can be identified and/or extracted to identify elements named in a comment and the named elements from comments can be correlated with image elements identified in the image to filter comments specific to an individual element. The comments specific to an element in the image can be associated with the element and displayed, for example as an overlay, in response to an interaction when the element in the image.

This Detailed Description section is divided into the following sub-sections: The Hardware and Software Environment; Example Embodiments; Further Comments and/or Embodiments; and Definitions.

The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1 is a functional block diagram illustrating various portions of networked computers system 100, including: server sub-system 102; client sub-systems 104, 106, 108, 110, 112; communication network 114; server computer 200; communication unit 202; processor set 204; input/output (I/O) interface set 206; memory device 208; persistent storage device 210; display device 212; external device set 214; random access memory (RAM) devices 230; cache memory device 232; and program 300.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine-readable instructions and/or data that can be used to create, manage, and control certain software functions, such as will be discussed in detail, below, in the Example Embodiment sub-section of this Detailed Description section. As an example, a program 300 can provide for image entity extraction and granular interactivity articulations, for example, including identifying distinct elements within an image, determining relevant descriptors/adjectives for identified elements, generating image maps to overlay the image allowing for interaction with elements depicted in an image, generating annotations for elements depicted in an image, text-image correlation between an image and associated comments, providing for display of annotations/comments associated with an element depicted in an image, and/or the like.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). For example, program 300 may include machine readable and performable instructions to provide for performance of method operations as disclosed herein. In this particular embodiment, persistent storage 210 includes a magnetic hard disk drive. To name some possible variations, persistent storage 210 may include a solid-state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor, a smart phone/tablet display screen, and/or the like.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Example Embodiments

Figure 2:
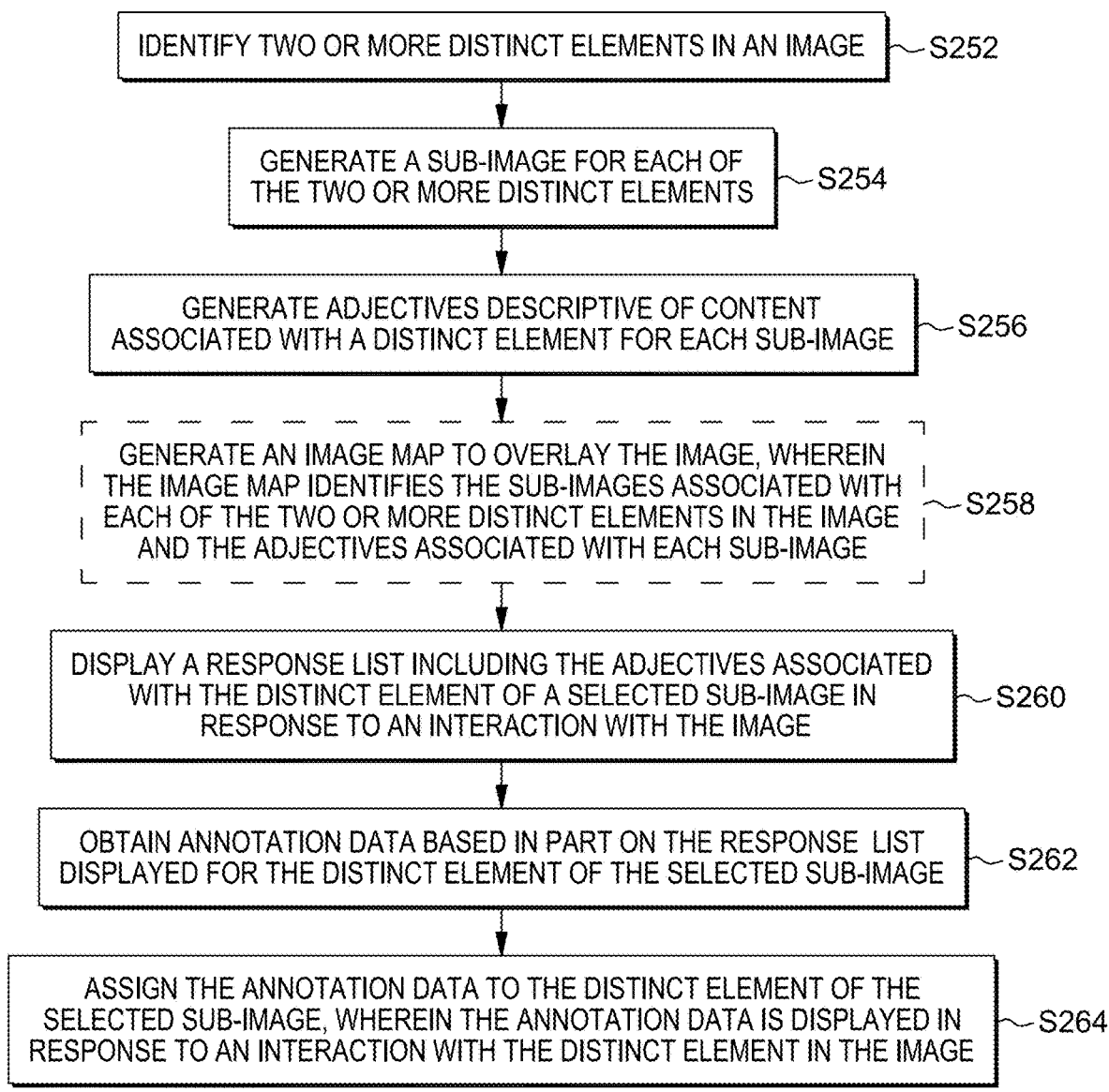
FIG. 2 depicts a flowchart showing a first embodiment method performed, at least in part, by the first embodiment system.
Figure 3:
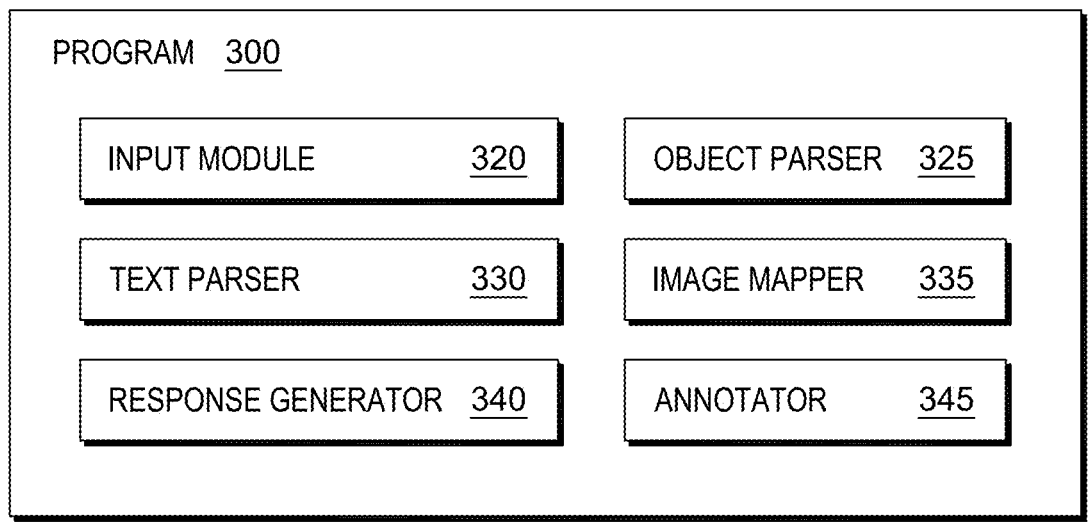
FIG. 3 depicts a block diagram showing an example machine logic (for example, software) portion of the first embodiment system.

FIG. 2 shows flowchart 250 depicting a computer-implemented method, according to embodiment(s) of the present invention. FIG. 3 shows a program 300 for performing at least some of the method operations of flowchart 250. Regarding FIG. 2, one or more flowchart blocks may be identified with dashed lines and represent optional steps that may additionally be included, but which are not necessarily required, in the depicted embodiments. This method and associated software will now be discussed, over the course of the following paragraphs, with extensive reference to FIG. 2 (for the method operation blocks) and FIG. 3 (for the software blocks).

As illustrated in FIG. 2, in some embodiments, operations for image entity extraction and granular interactivity begin at operation S252, where a computing system (e.g., server computer 200 of FIG. 1 or the like) can obtain an image and identify two or more distinct elements (e.g., entities, objects, items, components, etc.) in the image. As an example, an object parser 325 of FIG. 3 and/or the like can provide for obtaining an image and parsing the image to identify distinct elements depicted in the image, for example, detecting bounding boxes for each element in the image. For example, in some embodiments, the computing system can provide the image data to an artificial intelligence (AI) image analyzer and/or the like to analyze the distinct elements, objects, etc. in an image (e.g., hats, shoes, clothes, bags, jewelry, watches, other objects, scenery, structures, etc.) to break the image into separate images (e.g., sub-images, etc.) and determine what the identified elements/objects represent.

Processing proceeds to operation S254, where the computing system (e.g., server computer 200 of FIG. 1 or the like) generates a sub-image for each of the two or more distinct elements. In some embodiments, the computing system can break up the image into separate images (e.g., sub-images, etc.) and determine the elements (e.g., objects, etc.) represented in the separate images. As an example, an object parser 325 and/or the like can provide for generating a plurality of sub-images for the distinct elements identified in the image.

Processing proceeds to operation S256, where the computing system (e.g., server computer 200 of FIG. 1 or the like) generates adjectives descriptive of content associated with a distinct element for each sub-image. As an example, a response generator 340 of FIG. 3 and/or the like may generate adjectives (e.g., descriptors, reactions, etc.) associated with the elements. For example, the computing system can provide the identified elements to an AI module which can create relevant descriptors, adjectives, reactions, etc. for each of the elements. For instance, the computing system can create adjectives for objects/materials that a person is wearing, holding, using, and/or the like. The computing system can create adjectives for structures, scenery and/or the like depicted in the image, for example, based on the overall content of the image.

In some embodiments, the computing system can provide for parsing comment data associated with the image, for example using text entity recognition. For example, a text parser 330 and/or the like can identify one or more comments associated with an image. Each comment associated with an image can be parsed, for example using a named entity recognition algorithm or the like, and may be used for identifying any named objects in the image that are included in the comment text.

In some embodiments, a computing system may use text image correlation with convolutional neural network (CNN) geo-spatially identified elements and text modeling, such as natural language processing (NLP) bag of words, to extract certain keywords and correlate with the image analyzer.

Optionally, in some embodiments, processing may continue to operation S258, where the computing system (e.g., server computer 200 of FIG. 1 or the like) can generate an image map to overlay the image, wherein the image map identifies the sub-images associated with each of the two or more distinct elements in the image and the adjectives associated with each sub-image. In some embodiments, the computing system can determine interactions (e.g., mouse cursor hover, element selection, etc.) associated with each sub-image of the image based on the image map overlaying the image. In some embodiments, the computing system can provide for displaying the response list for a distinct element based, at least in part, on the image map. As an example, an image mapper 335 of FIG. 3 and/or the like may generate an image map to overlay the image.

Processing proceeds to operation S260, where the computing system (e.g., server computer 200 of FIG. 1 or the like) provides for displaying a response list including the adjectives associated with the distinct element of a selected sub-image in response to an interaction with the image. As an example, a response generator 340 of FIG. 3 and/or the like may generate and display a response list, comment menu, popup, and or the like, that includes the adjectives, descriptors, reactions, etc. associated with a specific elements (e.g., an element being interacted with, clicked on, etc.). In some embodiments, for example, an image map can be placed on top of the image and when a mouse cursor or the like is hovered over a particular element (e.g., object, component, etc.), the relevant adjectives, descriptors, reactions, etc. for that element can be displayed (e.g., popup menu, etc.) such that a user can click on an entry (adjective, descriptor, reaction, etc.) that they want to convey. In some embodiments, a customized response can be entered if the predetermined choices are not representative of the users desired reaction/comment.

Processing proceeds to operation S262, where the computing system (e.g., server computer 200 of FIG. 1 or the like) can obtain annotation data based in part on the response list displayed for the distinct element of the selected sub-image. As an example, an input module 320, response generator 340, annotator 345, and/or the like can provide for obtaining annotation data, for example, based on a user selection of a response (e.g., adjective, descriptor, custom input field, etc.) from a displayed response list.

In some embodiments, the computing system, for example, using an AI engine or the like, can analyze any customized responses provided by users for an element and determine if there are multiple similar customized responses. If multiple users enter similar customized responses, the computing system (e.g., AI engine, etc.) may add the customized response or a similar response as an additional preset selection.

Processing proceeds to operation S264, where the computing system (e.g., server computer 200 of FIG. 1 or the like) can assign the annotation data to the distinct element of the selected sub-image, wherein the annotation data is displayed in response to an interaction with the distinct element in the image. As an example, an annotator 345 and/or the like can provide for generating annotation data, for example, comments, responses, and/or the like, for an identified/selected element included in an image. The annotator 345 and/or the like can provide for assigning and/or otherwise associating the annotating data with the identified/selected element, for example, in conjunction with an image map and/or the like. The annotator 345 and/or the like can provide the annotation data such that it can be displayed when an interaction (e.g., mouse cursor hover, selection, click, etc.) occurs in relation to the identified element included in the image. for display.

Further Comments and/or Embodiments

Figure 4:
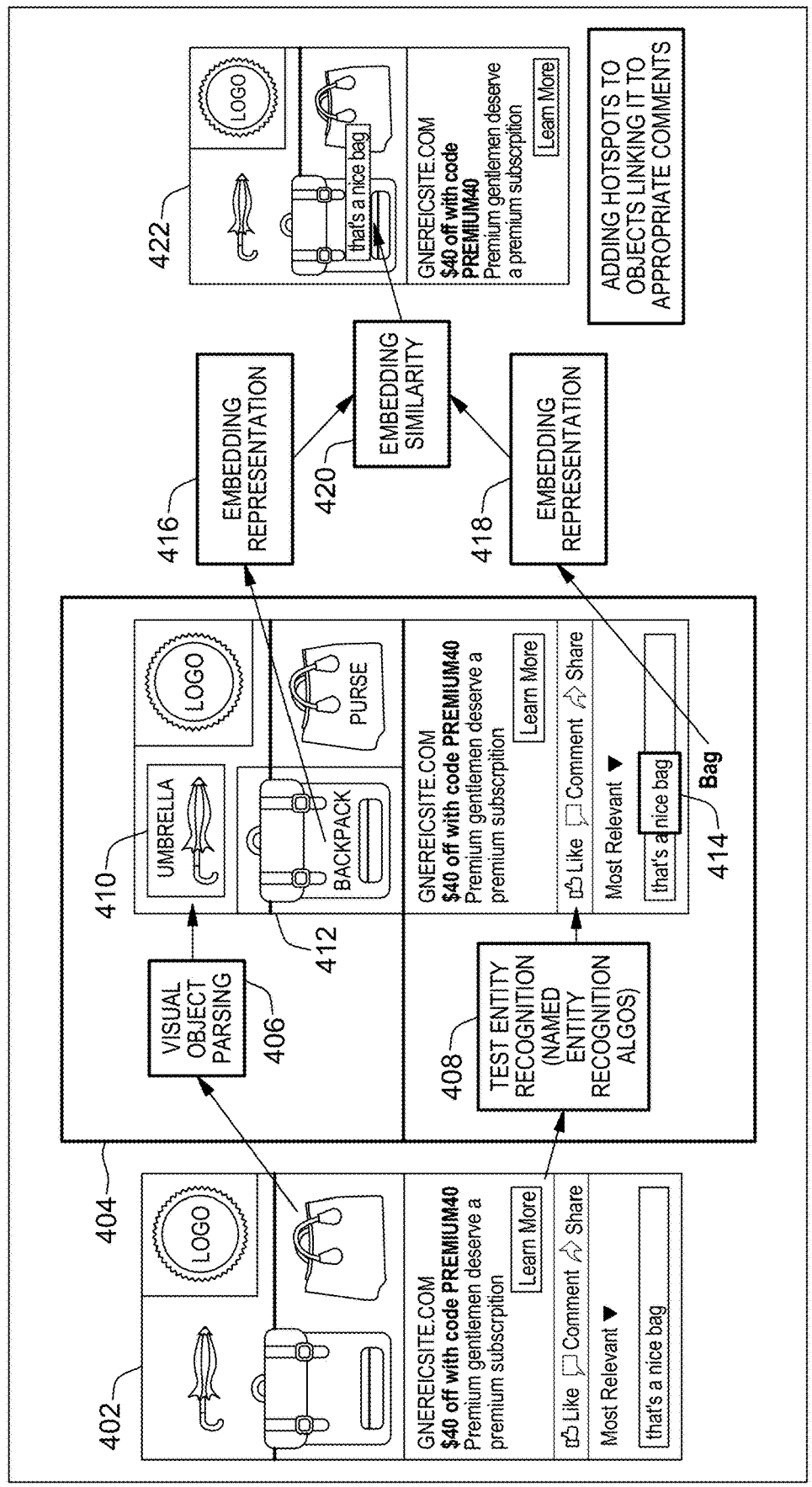
FIG. 4 depicts a block diagram of an example of entity extraction and granular interactivity articulation, according to embodiments of the present invention.

FIG. 4 depicts a block diagram showing an example of image entity extraction and granular interactivity articulation, illustrated by parsing/embedding flow 400, according to the present invention. As illustrated in FIG. 4, in some embodiments, a parsing/embedding flow 400 may obtain image data input, such as image/comment input 402. In some embodiments, parsing/embedding flow 400 may obtain comment data input associated with the image, such as illustrated in image/comment input 402.

In some embodiments, the image/comment input 402 can be provided to an image-text correlator 404. An image-text correlator 404 can include a visual object parser 406 which can parse one or more objects depicted in the image associated with image/comment input 402. For example, the visual object parser 406 can use one or more object parsing techniques (e.g., you only look once (YOLO) object detection, etc.) to identify one or more distinct elements include in the image and detect/generate bounding boxes for each distinct element, such as element 410, element 412, and/or the like.

The image-text correlator can include a text parser 408 which can provide for parsing comment data associated with the image, for example using text entity recognition. For example, text parser 408 can identify one or more comments associated with an identified element within the image, such as comment 414. For example, each comment associated with an image can be parsed, for example using a named entity recognition algorithm or the like (e.g., conditional random fields (CRF), BERT named entity recognition (BERT-NER), etc.), to identify any named objects included in the comment text.

The identified distinct objects, such as element 410, element 412, and/or the like, can be converted to embedding representations (e.g., neural embedding, etc.), such as element embedding representation 416. Additionally, the identified objects from the parsed comments, such as comment 414 and/or the like, can be converted to embedding representations (e.g., neural embedding, etc.), such as named object embedding representation 418, for example, by applying representation algorithms (e.g., word2vec, etc.).

In some embodiments, the word discovered using visual parsing and the text parsing (e.g., NER) may not be on the same space, so the embedding conversion can be applied to bring them to a common space. For example, the visual parsing could detect "bag" (e.g., the named object in the comment 414) as "backpack" (e.g., the identified element 412). The embedding conversion can provide for correlating the backpack of element 412 to "bag" as discovered in the text comment 414.

An embedding similarity 420, for example, cosine, Euclidian, and/or the like, can be determined between the embedding representations, for example, between the embedding representation 416 for element 412 and the embedding representation 418 for comment 414. The embedding similarity 420 can be used to identify suitable comments that may be overlaid on the elements in the image. For example, comment 414 can be overlaid on element 412 in interactive image 422.

In some embodiments, for example, keywords pertaining to certain geo-spatial areas in the image can be extracted, based on the neural embeddings and the similarity matrix (e.g., cosine similarity matrix, etc.), and stored in a vector as a key value pair in the form of a dictionary where the data indicated the element/entity and its respective coordinates, such as in the form [Bag:{x.y}].

In some embodiments, text extracted using entity recognition algorithms, as described above, may be clustered together. Associative identification can then be done using cosine similarity, for example, where a table can be created based on the elements (e.g., objects, etc.) identified in the image and the text that correlates with the associated element (e.g., object, etc.) from the comments. As an example, using:

$$\cos\theta = \frac{\vec{a}\cdot\vec{b}}{\|\vec{a}\|\|\vec{b}\|} = \frac{\Sigma_1^n a_i b_i}{\sqrt{\Sigma_1^n a_i^2}\sqrt{\Sigma_1^n b_i^2}}$$

where $\vec{a}\cdot\vec{b} = \Sigma_1^n a_i b_i = a_1 b_1 + a_2 b_2 + \ldots + a_n b_n$ is the dot product of the two vectors.

the term matrix contains the word counts of the certain cluster (e.g., bag) identified and associated via the cosine similarity matrix with the image coordinates.

In some embodiments, a computing system may use text image correlation with convolutional neural network (CNN) geo-spatially identified elements and text modeling, such as natural language processing (NLP) bag of words, to extract certain keywords and correlate with the image analyzer.

Figure 5:
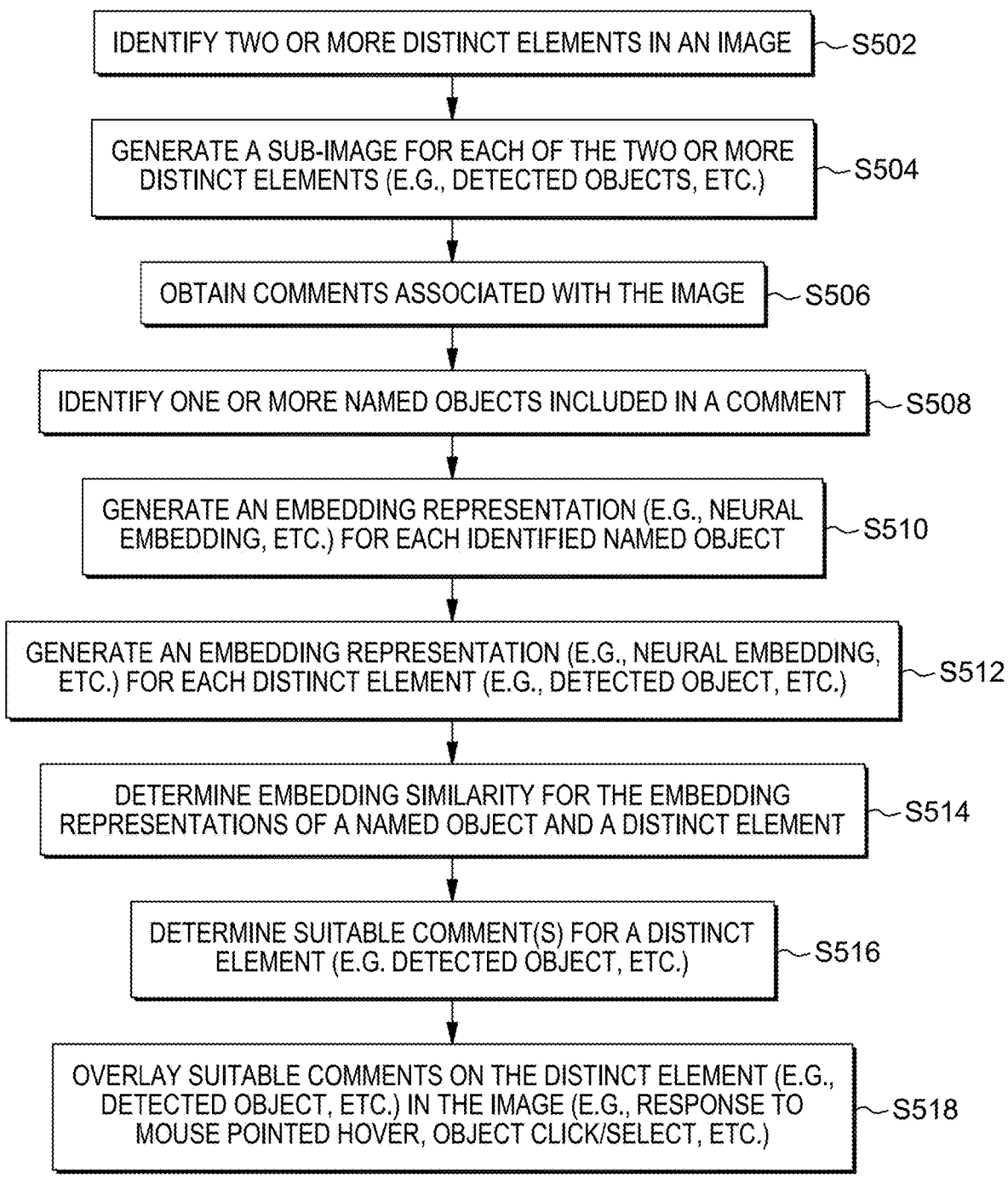
FIG. 5 depicts a flowchart of an example embodiment of entity extraction and granular interactivity articulation, according to embodiments of the present invention.

FIG. 5 depicts a flowchart 500 of a computer-implemented method for another example embodiment of entity extraction and granular interactivity articulation, according to embodiments of the present invention.

As illustrated in FIG. 5, in some embodiments, operations for image entity extraction and granular interactivity begin at operation S502, where a computing system (e.g., server computer 200 of FIG. 1 or the like) can obtain an image and identify distinct elements (e.g., detected objects, etc.) in an image.

Processing proceeds to operation S504, where the computing system (e.g., server computer 200 of FIG. 1 or the like) can generate a sub-image for each distinct element (e.g., detected object, etc.).

Processing proceeds to operation S506, where the computing system (e.g., server computer 200 of FIG. 1 or the like) can obtain comment data representative of one or more comments associated with the image.

Processing proceeds to operation S508, where the computing system (e.g., server computer 200 of FIG. 1 or the like) can identify named objects included in the one or more comments.

Processing proceeds to operation S510, where the computing system (e.g., server computer 200 of FIG. 1 or the like) can generate an embedding representation for each named object identified.

Processing proceeds to operation S512, where the computing system (e.g., server computer 200 of FIG. 1 or the like) can generate an embedding representation for each of the two or more distinct elements identified in the image.

Processing proceeds to operation S514, where the computing system (e.g., server computer 200 of FIG. 1 or the like) can determine an embedding similarity for a named object embedding representation and a distinct element embedding representation.

Processing proceeds to operation S516, where the computing system (e.g., server computer 200 of FIG. 1 or the like) can determine one or more suitable comments for a particular distinct element based, at least in part, on the embedding similarity.

Processing proceeds to operation S518, where the computing system (e.g., server computer 200 of FIG. 1 or the like) can provide the one or more suitable comments to be overlaid on the particular distinct element in the image in response to an interaction with the image.

Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

Data communication: any sort of data communication scheme now known or to be developed in the future, including wireless communication, wired communication and communication routes that have wireless and wired portions; data communication is not necessarily limited to: (i) direct data communication; (ii) indirect data communication; and/or (iii) data communication where the format, packetization status, medium, encryption status and/or protocol remains constant over the entire course of the data communication.

Receive/provide/send/input/output/report: unless otherwise explicitly specified, these words should not be taken to imply: (i) any particular degree of directness with respect to the relationship between their objects and subjects; and/or (ii) absence of intermediate components, actions and/or things interposed between their objects and subjects.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method comprising:
identifying two or more distinct elements in an image;
generating sub-images for the two or more distinct elements;
for the distinct elements, generating adjectives descriptive of preexisting content associated with the respective distinct element by extracting the adjectives from the preexisting content;
detecting a user interaction with a particular one of the sub-images;
displaying a response list of responses including the adjectives associated with the particular element of the sub-image being interacted with in response to the user interaction with the sub-image, the list including a response having custom input field for enabling user input of a customized response;
obtaining annotation data based at least in part on user selection of one of the responses from the response list displayed for the distinct element of the sub-image being interacted with; and
assigning the annotation data to the distinct element of the sub-image being interacted with, wherein the annotation data is displayed in response to subsequent interactions with the distinct element in the image;
obtaining comment data representative of one or more comments associated with the image from an internet-based platform outputting the image, the one or more comments being posted by one or more previous users;
identifying named objects included in the one or more comments;
generating embedding representations for the named objects identified;
generating embedding representations for the two or more distinct elements identified in the image;
determining embedding similarities for the named object embedding representations and the distinct element embedding representations;
determining one or more suitable comments for a particular one of the distinct elements based, at least in part, on the embedding similarity thereof; and
providing the one or more suitable comments to be overlaid on the particular distinct element in the image in response to an interaction with the image.

2. The computer-implemented method of claim 1, comprising:
generating an image map to overlay the image, wherein the image map identifies the sub-images associated with the two or more distinct elements in the image and adjectives associated with the respective sub-image; and
determining interactions associated with the sub-images based on the image map overlaying the image.

3. The computer-implemented method of claim 1, wherein generating sub-images for the two or more distinct elements comprises:
detecting bounding boxes for the distinct elements identified in the image based on object parsing applied to the image.

4. The computer-implemented method of claim 1, comprising
detecting a user interaction with a particular one of the sub-images;

displaying a response list of responses including adjectives associated with a particular element of the sub-image being interacted with in response to the user interaction with the sub-image, wherein the response list includes a customized response entry; and in response to selection of the customized response entry:
obtaining customized response data, and
providing the customized response data as annotation data assigned to the particular element.

5. The computer-implemented method of claim 4, comprising:
analyzing a plurality of instances of customized response data associated with the distinct element;
identifying multiple similar responses in the plurality of instances of customized response data; and
providing a new entry to be included in the response list for the distinct element based on the multiple similar responses identified.

6. The computer-implemented method of claim 4, wherein the adjectives include adjectives descriptive of objects depicted with the distinct elements.

7. The computer-implemented method of claim 4, wherein the adjectives include adjectives descriptive of overall content of the distinct elements.

8. The computer-implemented method of claim 1, wherein an image map is used to overlay the one or more suitable comments on the particular distinct element in the image, wherein the internet-based platform is part of a social media platform.

9. A computer program product comprising a non-transitory computer readable storage medium, the computer readable storage medium storing:
program instructions to identify two or more distinct elements in an image;
program instructions to generate sub-images for the two or more distinct elements;
program instructions to generate named object embedding representations for a named object identified in comments about the image posted by previous users on an internet-based platform having the image;
program instructions to generate distinct element embedding representation for the two or more distinct elements identified in the image;
program instructions to determine an embedding similarity for the named object embedding representations and the distinct element embedding representations for the two or more distinct elements identified in the image;
program instructions to select one or more comments about a particular distinct element based, at least in part, on the embedding similarity;
program instructions to display a response list including the one or more comments about the particular distinct element of a selected sub-image in response to an interaction with the image;
program instructions to obtain annotation data based in part on user selection of one of the one or more comments in the response list displayed for the distinct element of the selected sub-image; and
program instructions to assign the annotation data to the distinct element of the selected sub-image,
wherein the annotation data is displayed in response to subsequent interactions with the distinct element in the image.

10. The computer program product comprising the non-transitory computer readable storage medium of claim 9, the computer readable storage medium storing:

program instructions to generate an image map to overlay the image, wherein the image map identifies the sub-images associated with the two or more distinct elements in the image and the selected comment associated with the respective sub-image; and
program instructions to determine interactions associated with the sub-images of the image based on the image map overlaying the image.

11. The computer program product comprising the non-transitory computer readable storage medium of claim 9, wherein the assigned annotation data includes text of the selected comment.

12. The computer program product comprising the non-transitory computer readable storage medium of claim 9, the computer readable storage medium storing:
program instructions to overlay text of the selected comment on the particular distinct element in the image in response to an interaction with the image.

13. The computer program product comprising the non-transitory computer readable storage medium of claim 9, wherein the response list includes a customized response entry; and
the computer readable storage medium storing program instructions programmed to:
in response to selection of the customized response entry, obtain customized response data; and
provide the customized response data as the annotation data.

14. The computer program product comprising the non-transitory computer readable storage medium of claim 13, the computer readable storage medium storing:
program instructions programmed to analyze a plurality of instances of customized response data associated with the distinct element;
program instructions programmed to identify multiple similar responses in the plurality of instances of customized response data; and
program instructions programmed to provide a new entry to be included in the response list for the distinct element based on the multiple similar responses identified.

15. The computer program product comprising the non-transitory computer readable storage medium of claim 9, wherein the internet-based platform includes a web page.

16. A computer system comprising:
a processor set; and
a computer readable storage medium;
wherein:
the processor set is structured, located, connected, and programmed to run program instructions stored on the computer readable storage medium; and
the stored program instructions include:
program instructions to identify two or more distinct elements in an image;
program instructions to generate sub-images for the two or more distinct elements;
program instructions to analyze comments associated with the image and posted by multiple users on an internet based platform for associating at least some of the comments with the distinct elements;
program instructions to identify named objects included in one or more of the comments;
program instructions to generate embedding representations for the named objects identified;
program instructions to generate embedding representations for the two or more distinct elements identified in the image;

program instructions to determine an embedding similarity for the named object embedding representations and the distinct element embedding representations;

program instructions to determine one or more suitable comments for a particular distinct element based, at least in part, on the embedding similarity; and program instructions to provide the one or more suitable comments to be overlaid on the particular distinct element in the image in response to an interaction with the image wherein the one or more suitable comments is displayed in response to subsequent interactions with the distinct element in the image.

17. The computer system of claim 16, wherein the stored program instructions include:

program instructions to generate an image map to overlay the image, wherein the image map identifies the sub-images associated with the two or more distinct elements in the image and the comments associated with the respective sub-image; and program instructions to determine interactions associated with the sub-images of the image based on the image map overlaying the image.

18. The computer system of claim 16, wherein the stored program instructions include:

program instructions to display a response list including at least one of the comments associated with the distinct elements of one of the sub-images in response to an interaction with the image;

program instructions to receive selection of one of the comments from the response list displayed for the distinct element of the sub-image being interacted with; and program instructions programmed to assign the selected comment to the distinct element of the sub-image, wherein the selected comment is displayed in response to subsequent interactions with the distinct element in the image.

19. The computer system of claim 18, wherein the response list having the at least one comment includes a customized response entry; and the computer readable storage medium having stored thereon:

program instructions to, in response to selection of the customized response entry, obtain customized response data; and program instructions to display the customized response data in response to subsequent interactions with the distinct element in the image.

* * * * *